United States Patent

Atsumi

[15] 3,643,895

[45] Feb. 22, 1972

[54] TAPE-RUNNING INDICATOR

[72] Inventor: Katsuya Atsumi, Tokyo, Japan

[73] Assignee: Akai Electric Company Limited, Tokyo, Japan

[22] Filed: Jan. 23, 1969

[21] Appl. No.: 793,497

[30] Foreign Application Priority Data

Jan. 23, 1968 Japan....................................43/4267

[52] U.S. Cl...........................242/201, 116/129 G, 242/57, 242/186, 242/210

[51] Int. Cl....................................B65h 61/00, G11b 19/28

[58] Field of Search...............................242/210, 186–190, 242/201, 57; 235/87; 116/129 G, 129 Q

[56] References Cited

UNITED STATES PATENTS

| | | | |
|---|---|---|---|
| 2,802,442 | 8/1957 | Helgeby | 116/129 Q UX |
| 3,167,264 | 1/1965 | Ohtsu | 242/57 X |

*Primary Examiner*—George F. Mautz
*Attorney*—Sughrue, Rothwell, Mion, Zinn & Macpeak

[57] ABSTRACT

A tape-running display unit for magnetic tape recorder, comprising a rotatable display drum provided with a dark-colored zone and a light-colored zone formed on the cylindrical surface of said drum the zones being defined by a helix and a generatrix, a slitlike window opening for viewing the movement of a part of said helix when said tape and said drum are moved in phase with each other; a selector runner adapted for showing a selected length of travel of said tape; an electrical switch arranged to be controlled by said selector when the tape has travelled the selected length and to control in turn the operation of the tape-reeling mechanism of the tape recorder.

3 Claims, 8 Drawing Figures

TAPE-RUNNING INDICATOR

This invention relates to a tape-running display unit highly suitable for use on magnetic tape recording and reproducing machines including video tape recorders.

The main object of the present invention is to provide a tape-running display unit by which a viewer can easily and clearly read a tape position where the tape is cooperating with the magnetic head unit, especially the recording and playback magnetic head thereof.

A further object is to provide a display unit of the above kind, capable of performing the display job with a remarkable design effect.

These and further objects, features and advantages of the invention will become more apparent upon reading the following detailed description of the invention and referring to the accompanying drawings which demonstrate substantially a preferred embodiment of the invention.

It should be noted however the specific embodiment shown is only for an illustrating purpose and various and different modifications may easily be made by those skilled in the art after reading the specification. It is thus stressed that these modifications are intended to be covered by the present invention so far as they fall within the scope of the appended claims.

Figures 1, 2, 8:
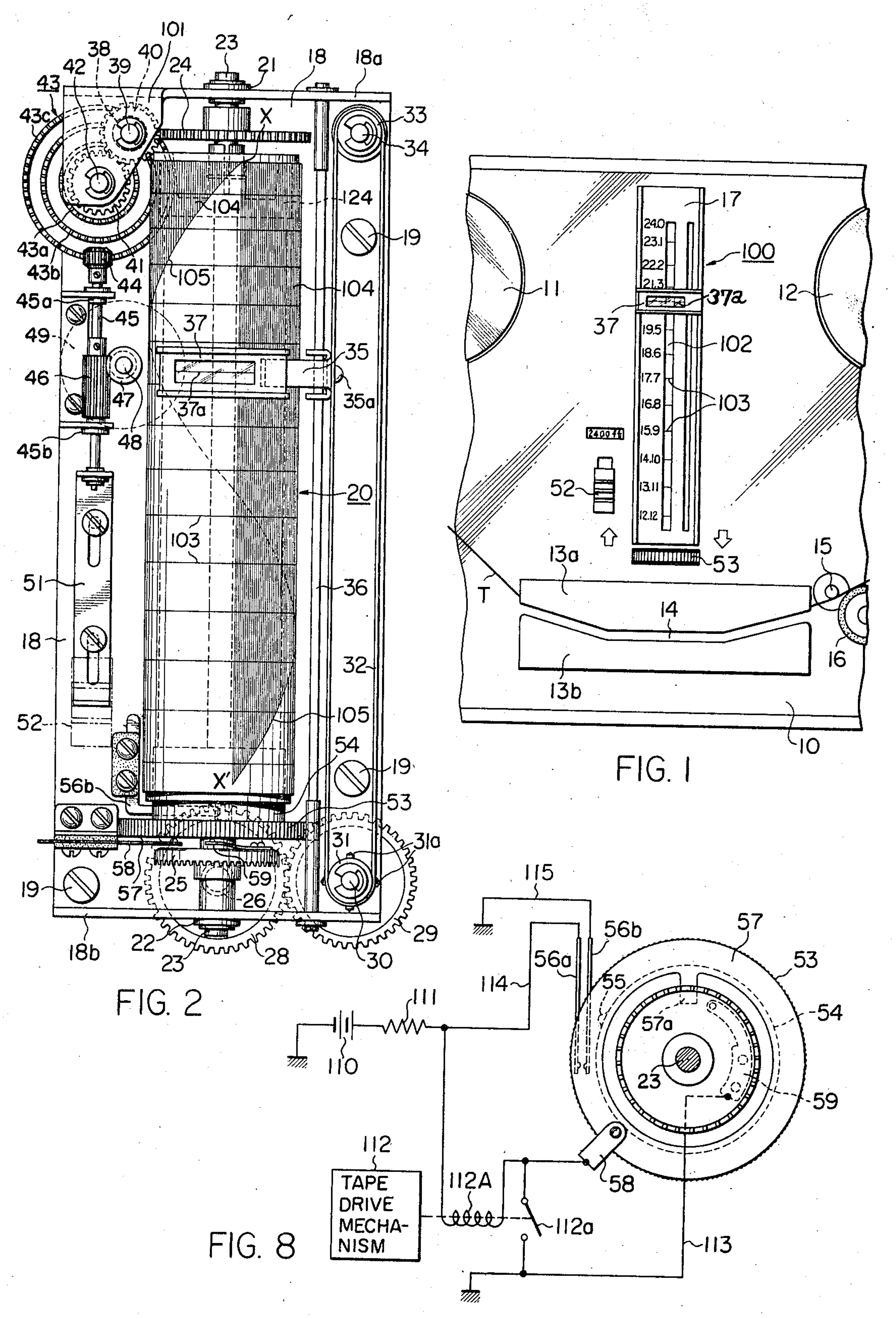
FIG. 1 is a top plan view of a chassis panel of a magnetic tape recorder which is fitted with a tape-running display unit as constructed in accordance with the principles of the present invention.
FIG. 2 is an enlarged plan view of the display unit according to the invention wherein, however, the cover of the unit and the chassis panel of the tape recorder have been omitted for clear representation of inner working elements.
FIG. 8 is a wiring diagram showing several electric parts employed.

Referring now to the accompanying drawings, numeral 10 represents a chassis panel of a magnetic tape recorder, a central part thereof only being shown in FIG. 1. A pair of turntables 11 and 12 are rotatably mounted on the chassis panel 10 for tape reeling purpose. A pair of head cover elements **13*a* and 13*b* are detachably attached onto the panel 10 so as to provide an elongated tape insertion slot 14 therebetween. There are a plurality of magnetic heads below the upper head cover 13*a* in FIG. 1, although not shown for simplicity, for cooperation with a magnetic tape T which is threaded from turntable 11 through the magnetic head group and further between a rotatable capstan 15 and a pinch roller 16 to another turntable 12** for tape reeling and magnetic recording or playback purpose.

The display unit, generally shown at 100, comprises a small panel 17 of a rectangular shape which is detachably mounted on a baseplate 18, the latter being attached from below fixedly by means of suitable fixing means such as a plurality of setscrews 19 onto the chassis of the tape recorder, now shown.

Figures 3, 4, 5, 6, 7:
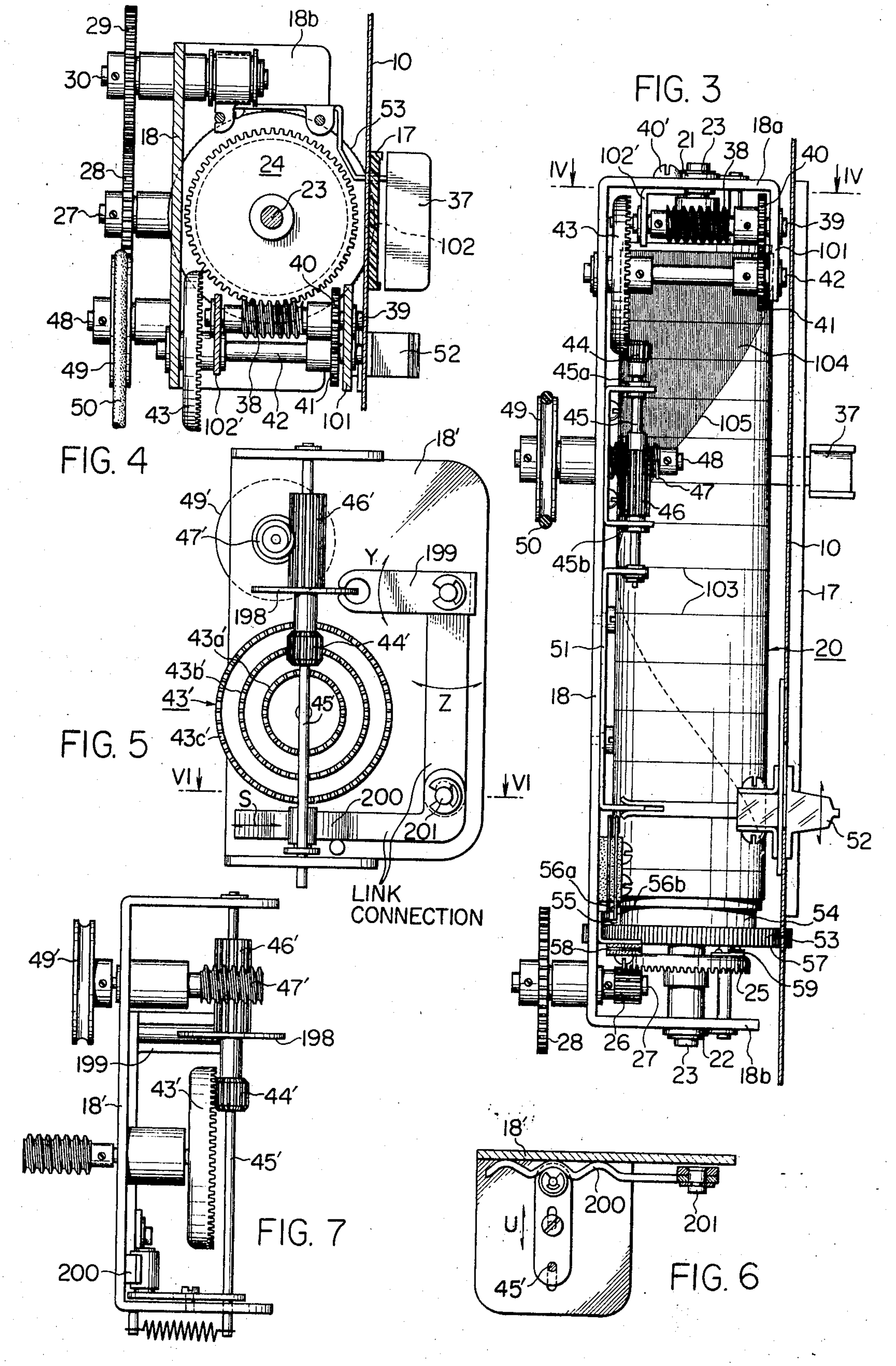
FIG. 3 is a side view when seen from left to right of FIG. 2, several parts being however shown in section.
FIG. 4 is a cross-sectional view taken substantially along the section line IV—IV in FIG. 3.
FIG. 5 is a cross-sectional view of a modification of the speed change mechanism employed in the foregoing.
FIG. 6 is a sectional view taken substantially along the section line VI—VI in FIG. 5.
FIG. 7 is an elevational view of part of the modified speed change mechanism shown in FIGS. 5 and 6.

A display drum 20 is rotatably mounted by a shaft 23 through bearings 21 and 22 on the end flanges **18*a* and 18*b* of said baseplate. A gear 24 is fixedly mounted on shaft 23 which is coupled however with the display drum by means of a mechanical clutch 124 shown in FIG. 2 by dotted lines. A crown gear 25 is rotatably mounted on the shaft 23 which is kept in meshing with a pinion 26 mounted fixedly in turn on the inner end of a lateral shaft 27, as shown in FIG. 3. A gear 28 is fixedly mounted on the outer end of the shaft 27 and kept in meshing with a gear 29 which is fixedly mounted on the outer end of a second lateral shaft 30, the latter carrying a pinwheel 31 (FIG. 2). An endless and perforated belt 32 is threaded around said pinwheel 31 and a plain pulley 33 mounted rotatably on a short vertical shaft 34 which is studded on the baseplate 18. Although the perforations of the belt 32 are not shown, the pitch length between two successive perforations has been designed to be equal to the peripheral pitch between a successive two of a number of driving pins 31*a* attached radially of and fixedly on the pinwheel 31**.

A slide 35 which is slidable along an elongated guide bar 36 is attached to the belt 32 by means of a proper fixing means **35*a* such as a rivet and carries in turn a selector runner 37 which is provided with an indicator line 37*a***.

Gear 24 is kept in meshing with a worm 38 which is formed on a second vertical shaft 39 rotatably mounted by a proper bearing means on a stationary flange 101 formed integral with said end flange **18*a* (FIG. 2), and by a supporting bracket 102′ which is fixedly attached by means of setscrews 40′ to the end flange 18*a* of said baseplate 18 (FIG. 3). The worm 38** is most clearly be seen from FIG. 3.

The shaft 39 mounts fixedly a gear 40 which is kept in meshing with gear 41 fixedly attached on one end of a third vertical shaft 42. The shaft 42 is arranged in parallel with second vertical shaft 39 and rotatably mounted by the baseplate 18 as a whole. A second crown gear 43 is mounted fixedly on the opposite end of said third vertical shaft and kept in meshing with a pinion 44 which is mounted fixedly on one end of a shaft 45, the latter being rotatably and slidably mounted by means of bearing means **45*a* and 45*b* on the baseplate 18. In practice, the crown gear 43 is composed of three different diameter wheel elements 43*a*, 43*b* and 43*c*, concentrically arranged one after another when seen from the smallest to the largest wheel element, as may clearly be supposed from FIG. 5. As will be later described, the pinion 44** can be selectively engaged with any one of these wheel elements.

The shaft 45 is formed with a worm gear 46 which is kept in meshing with a worm 47 formed in turn on a lateral shaft 48, the latter being rotatably mounted on said baseplate 18. A pulley 49 is fixedly mounted on the outer end of said shaft 48 and connected drivingly by an endless belt 50 to the shaft, not shown, of either of said turntable 11 or 12, as the case may be, for rotating in phase therewith.

One end of the shaft 45 is linked with an actuator slide 51 which is slidably mounted on the baseplate 18 and mechanically connected with a selector knob 52, the latter being capable of being positioned manually at three different positions, so as to bring the pinion 45 into selective engagement with any one of three wheel elements **43*a–c*. Although the design and arrangement of said knob 52 can most clearly be seen from FIG. 3, reference should be had also to FIG. 1 wherein the manipulatability of said knob 52 is seen as partially projecting from the upper surface of chassis panel 10. For easy and smooth engagement of the pinion 44 with any one of wheel elements 43*a–c*, the speed change gear assembly comprising gear 41, shaft 42 and crown gear 43 is designed preferably in a floating design and resiliently urged to move in the axial direction of the shaft 42 towards right-hand side when seen in FIG. 3 by provision of an urging spring, although not specifically shown in the drawing. For the same purpose, the pinion 44** is bevelled at its both ends, as shown also in FIG. 3.

At the lower end of the drum 20 when seen in FIGS. 1–3, a manipulating disc 53 is fixedly attached thereto. As most clearly seen from FIG. 3, a part of the manipulating disc protrudes from the upper surface of the panel 10 for providing an easy access to the disc, said small panel 17 being provided with two series of tape length-indicating numerals 0–12 and 12–24, the last numeral 24 being corresponding to the whole length, in this specific embodiment 2,400 feet, two tracks in total, of the tape schematically shown at T in FIG. 1. Thus, the drum can be rotated manually as desired by manipulating said disc. There is provided in the small or auxiliary panel 17 an elongated viewing window 102, said indicating numerals 0–24 being arranged along one side of said window. If desired, they may be arranged at the both sides of said window.

The display drum 20 is provided with a plurality of, 12 in this specific embodiment, indicating lines 103, each of which describes a complete circle on the drum surface. These indicating lines 103 correspond in their position to those of numeral pair such as 14·10, 15·9 and the like.

On the drum surface, there is a dark-colored zone 104 which is defined by a generatrix X–X′, on the one hand, and by a helix 105, on the other hand. The remaining half zone of the drum surface is colored with a light color tone. The helix 105 starts at the upper end of said generatrix and ends at the lower end thereof, thus the pitch of said helix is substantially equal to the length of the drum.

With the above arrangement, when the drum is rotated in one direction, the viewer will see that an inclined line travels along said viewing window 102, the travelling direction being determined by the selected rotational direction of the drum which corresponds to the travelling direction of the running magnetic tape T, as will be more fully described hereinafter. With the rotation of the drum, the proportion of the dark-colored zone with respect to the light-colored zone will shift, the inclined line of the helix dividing the dark-colored zone from the light-colored zone. It will be noted that with a complete revolution of the drum, the indicating inclined line, constituting a variable part of said helix, travels along from one end to the other of said viewing window. An operator, by looking at viewing window 102, can quickly and easily determine the amount of tape which has passed from turntable 11 to turntable 12 by noting the position of dark-colored zone relative to the light-colored zone visible in viewing window 102. Helix 105 which divides the dark zone from the light zone indicates the exact amount of tape which has passed from 11 to 12.

A camming projection 55 is fixedly attached on the peripheral surface of the reduced cylindrical part 54 of the stepped manipulating disc 53. See FIGS. 3 and 8.

A pair of electrical contacts **56*a* and 56*b*, normally kept open, are mounted on the baseplate 18 and arranged to close when said projection 55 is brought into pressure contact with one of said electrical contacts such as 56*b***.

Although the stepped manipulating disc 53, 54 is made of an insulating material, the ring surface 57 thereof which is opposite to crown gear 25 is metallized by fixedly attaching a conducting ring strip, although not specifically shown, so as to thereby constitute a slipring which is kept in electrical contact with a brush 58. In addition, said slipring at 57 is formed with an inwardly and radially extending conductive strip **57*a* which is adapted for contact with a conductive arcuate strip 59 fixedly attached at one end to the upper surface of said crown gear 25, when seen in FIG. 2**.

Before initiation of the description on the operation of the mechanism, a preliminary knowledge of the effect of occasional difference in the tape reel diameters must be required.

With the tape recorder shown, it is assumed at first that the operator can record or play back vocal or musical information on or from any one of three different-sized tape reels such as 1,200 feet, 2,400 feet and 3,600 feet. With a longer tape, the rotational speed of display drum 20 must slow down correspondingly.

When the operator desires to manipulate the longest tape, he should shift the operating knob 52 to the lowest operating position in FIG. 3 as shown, so as to bring the pinion 44 into meshing with the outermost crown gear element **43*c***.

When the operator manipulates the middle length tape, he must raise the knob 52 to its middle operating position, so as to bring the pinion 44 into registration with the middle crown gear element **43*b***.

In the similar way, when it is desired to manipulate the shortest tape, the operator must further raise the knob 52 to its uppermost operating position, for bringing the pinion 44 into meshing with the innermost crown gear element **43*a*, so as to speedup correspondingly the rotational speed of drum 20**.

When it is desired to play a portion of a tape such as 400 feet of a 1,200-foot tape, the selector knob is shifted manually along the auxiliary panel 17 or more specifically along the guide bar 36 until its indicator line **37*a* is brought into registration with the desired indicating numeral "4". Indicating lines 103 provide a convenient means for reading the position of indicator line 37*a* or the position of the inclined line of helix 105 with respect to the numeral pairs on panel 17. By this manipulation, the endless belt 32 is rotated correspondingly and motion is transmitted therefrom through pinwheel 31, shaft 30, gear 29, gear 28, shaft 27, pinion 26 to crown gear 25, so as to bring conducting strip 59** on the latter to a predetermined position.

Next, when the operator manipulates a starting switch, not shown, of the tape recorder to "on", the tape-reeling mechanism of the recorder starts to rotate the tape supply reel, for instance, at 11. Beforehand, the capstan 15 has naturally been kept in rotation, and the pinch roll 16 is brought into its cooperating position therewith, for the delivery of the tape T at a certain constant speed.

Motion is therefore transmitted from the turntable 11 through transmission belt 50, pulley 49, worm 47, worm wheel 46, shaft 45, pinion 44, crown wheel 43, shaft 42, gear 41, gear 40, worm 38, worm wheel 24 to the shaft 23, thence through clutch 124 to the display drum 20 which is thus rotated at a constant, yet relatively slow speed.

Therefore, the indicating line constituted by a variable small part of the helix 105 will descend from the uppermost end of the viewing window 102 until it is brought into registration with the specifically preselected indicator numeral "4". At this point, slipring 57 on the disc 53 is brought by its radial extension **57*a* into electrical contact with conductive strip 59**.

Current flows therefore from battery 110 through **111–112A–58–57–57*a*–59–113 to ground. Thus, relay coil 112A is energized and tape drive mechanism 112 of known construction is brought into its reverse mode and the tape T is reversedly driven, or more specifically from turntable 12 to 11. Relay contact 112*a* is closed so as to maintain the relay coil circuit. Naturally, rotation of display drum 20 is also reversed and thus the indicating or display line will travel along the window 102** from the point "4" reversely upwards.

The position of the cam projection 55 relative to contact pair **56*a*–56*b* is so selected that when the top end of helix 105 comes to the uppermost end of viewing window 102 these contacts are closed by contact with said projection 55. If it is desired to shift the position of cam projection 55, the manipulating disc 53** may be turned in one or another direction.

In this way, the display drum can be rotated relative to the drum-driving mechanism, because motion from the disc is checked at the worm gearing 24 and 38, and the drum is rotated forcibly, yet independently. The provision of clutch 124 serves well for this purpose.

With closure of contacts **56*a* and 56*b*, current will flow from battery 110 through 111, 114, 56*a*, 56*b*, 115 to ground. Current supply through relay coil 112A is practically ceased so as to substantially deenergize the relay, so that the tape drive mechanism 112** is brought into its normal operation mode whereby the tape running is again reversed into its forward direction. The forward and reversing action of the motor will continue until the tape drive mechanism is cut off.

In the modification shown in FIGS. 5–7, a synchromeshing mechanism is employed for the speed gear change mechanism. In this modification, similar parts are denoted with same corresponding numerals attached with a prime.

When a rotational effort is applied to an actuator 199 as shown by an arrow Y, an arm rigidly connected with said actuator will then move as shown by an arrow Z. A member 200 linked at 201 will then move in the direction as shown by an arrow S. Since the member 200 is fabricated into a wavy configuration, see FIG. 6, shaft 45′ will move up or down, as hinted by an arrow U.

Therefore, pinion 44′ will move up or down relative to crown gear 43′. At the same time, the shaft 45′ will be moved in its longitudinal direction by engagement of a disc 198 fixedly attached to the same shaft, with the forked end of said member 199. In this way, any clogging of pinion 44′ may be prevented and always a smooth and easy engagement is assured.

What we claim is:

1. A tape-running display unit for a magnetic tape recording and reproducing machine comprising:

a. a tape-reeling mechanism;

b. a rotatable display drum mounted on a shaft and operatively connected to said tape-reeling mechanism by a first gearing means wherein said drum is rotated in phase with the tape-reeling mechanism;

c. a dark-colored display zone provided on the cylindrical surface of said drum and defined by a helix curve and a generatrix both extending substantially the whole axial length of said drum;

d. a light-colored display zone occupying the remaining area of the cylindrical surface of said drum;

e. a window opening arranged in close proximity to said drum and extending in the axial direction of said drum;

f. a mechanical clutch mounted on said shaft of said display drum between said first gearing means and said shaft for releasing said drum from said first gearing means so that the phase of said drum may be adjusted relative to said tape; and g. a manipulating means fixedly attached to said drum and projecting through a chassis panel of said machine for adjusting the phase of said drum relative to said tape by the rotation of said manipulating means.

2. A tape-running display unit as set forth in claim 1, further comprising:

a. a selector runner slideably mounted along said window opening, b. a second gearing means operatively connected with said selector runner, and c. switching means comprising a switching element mounted on said second gearing means and a mating switching element mounted on said drum said switching means electrically connected to a means for controlling said tape-reeling mechanism.

3. A tape-running display unit as set forth in claim 1, wherein said first gearing means comprises a gear fixedly attached to said rotatable shaft and a crown gear comprising different diameter wheel elements in coaxial relation with each other operatively connected to said gear.

* * * * *